2 Sheets—Sheet 1.
D. T. PHELPS & C. W. EDMONDS.
FIRE-ALARM TELEGRAPH REGISTERS.
No. 7,888. Reissued Sept. 18, 1877.
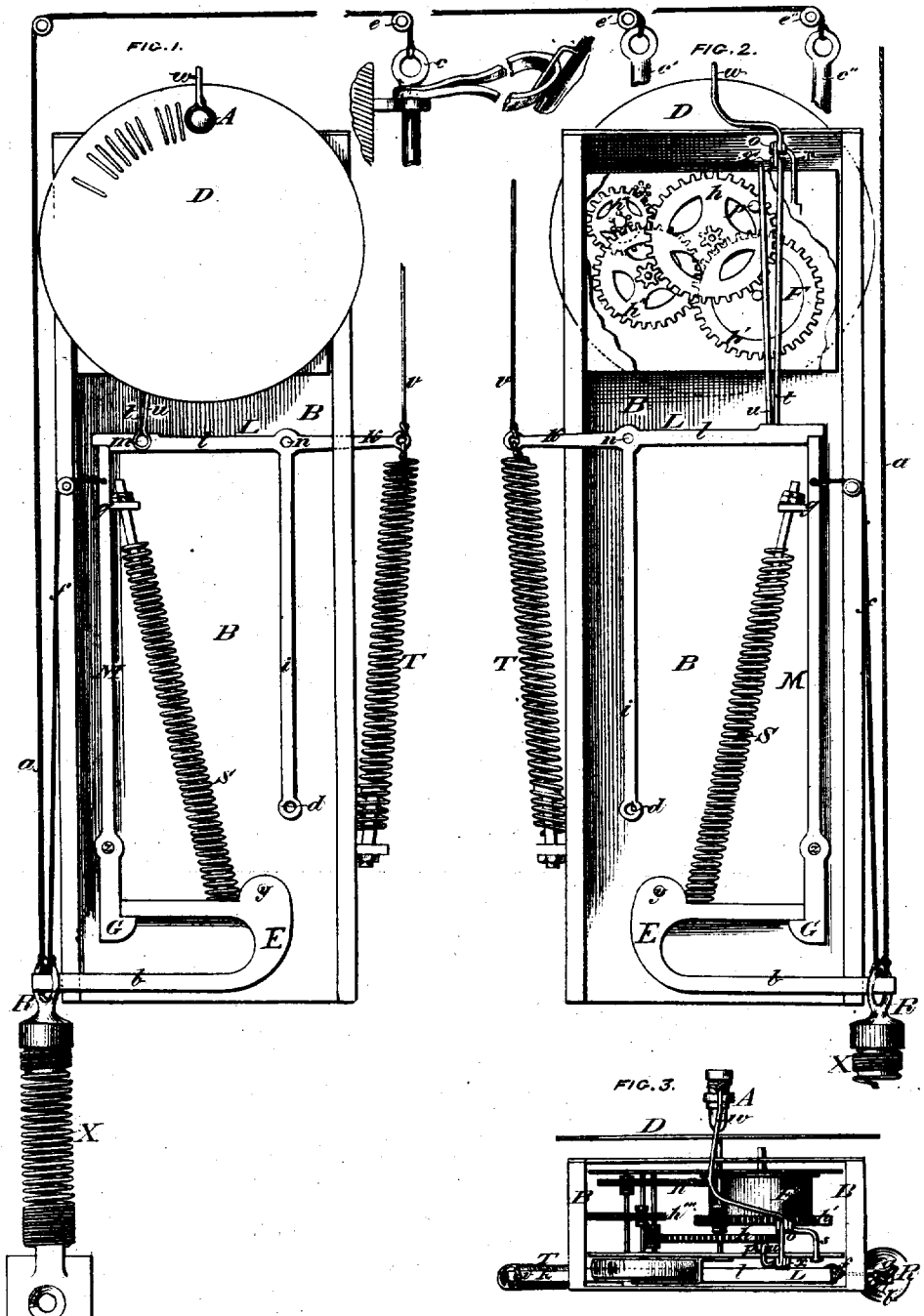
WITNESSES:
John A. Pitts
Robert Riling
INVENTORS:
Daniel T. Phelps
Charles W. Edmonds
Per Attn
Lionel Varicas
N. PETERS, Photo-Lithographer, Washington, D. C.

2 Sheets—Sheet 2.
D. T. PHELPS & C. W. EDMONDS.
FIRE-ALARM TELEGRAPH REGISTERS.
No. 7,888. Reissued Sept. 18, 1877.
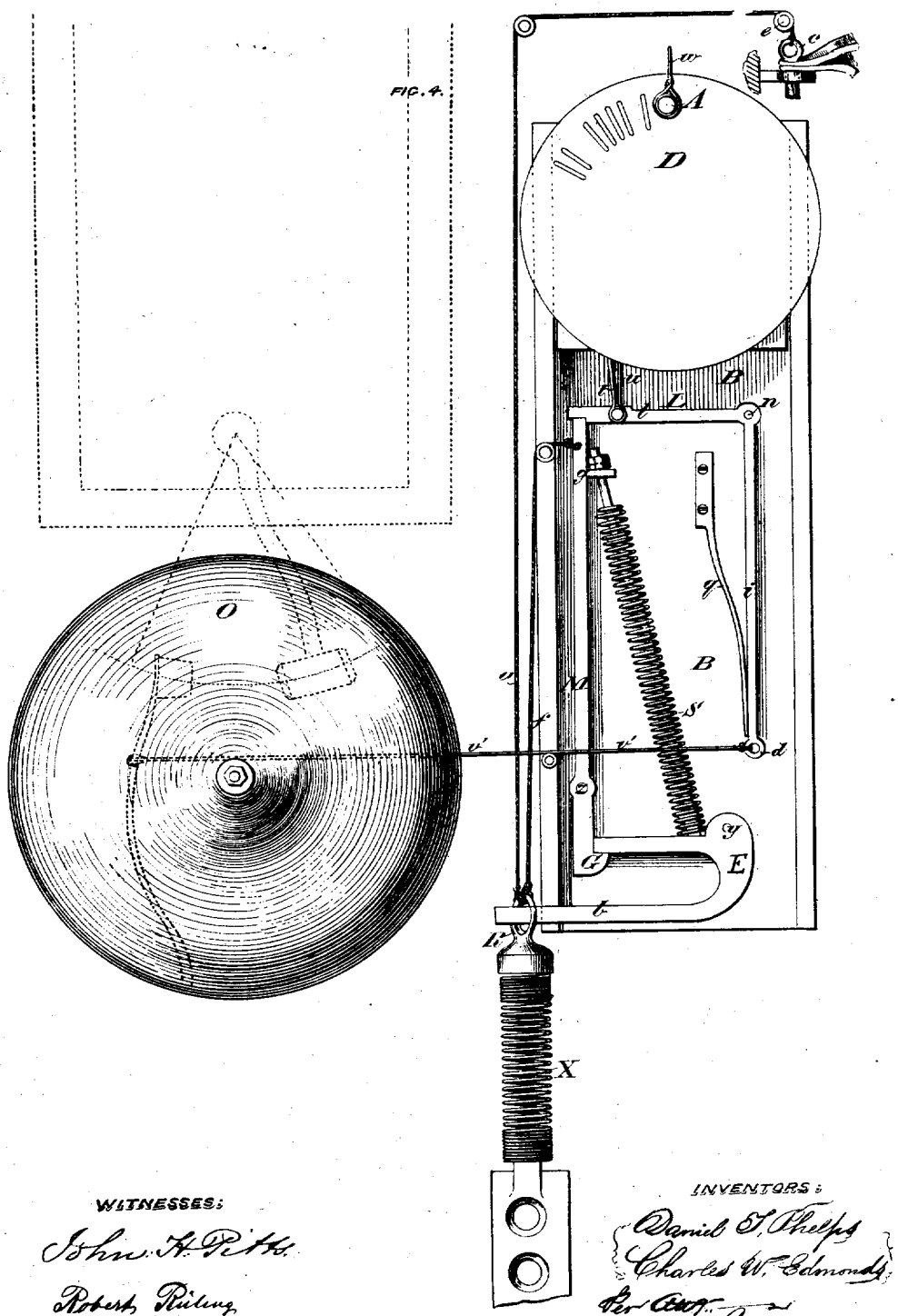
WITNESSES:
John A. Pitts
Robert Ruling
INVENTORS:
Daniel T. Phelps
Charles W. Edmonds
Per Attorney
Lunde Varicas.
N. PETERS, Photo-Lithographer, Washington, D. C.

UNITED STATES PATENT OFFICE.

DANIEL T. PHELPS AND CHARLES W. EDMONDS, OF SAN FRANCISCO, CAL.

IMPROVEMENT IN FIRE-ALARM-TELEGRAPH REGISTERS.

Specification forming part of Letters Patent No. 161,544, dated March 30, 1875; Reissue No. 7,888, dated September 18, 1877; application filed June 1, 1877.

*To all whom it may concern:*

Be it known that we, DANIEL T. PHELPS and CHARLES W. EDMONDS, both of the city and county of San Francisco, State of California, have invented an Improved Fire-Alarm Register and Horse-Detaching Rig, of which the following is a specification:

The first part of our invention consists in combining the hammer of a bell or gong, through suitable intervening mechanism, with an automatically-moving surface for receiving a record, in such a manner that on the first stroke of the hammer the surface to be marked on will be set in motion, and each stroke of the hammer will be duly recorded thereon, the marks being necessarily spaced in accordance with the intervals between the strokes of the hammer, because the recording surface has a constant motion during the time. Thus the number of the box or the district from which the alarm proceeded is recorded by visible marks about which there can be no mistake.

The second part of our invention relates to a detaching rig for horses employed for the fire department; and consists of a specific combination of halter-staples, provided with connecting ropes to a fixed spring or weight, and to a catch kept at tension with a catch-bar, tripping-lever, and bell or gong hammer connection, the whole being so arranged and constructed that at the first stroke of the hammer on the alarm bell or gong such horses may, by this device, be instantaneously released from their places at their respective stalls, and thus be allowed to proceed of their own accord to the head of the engine, hose-cart, &c., placed in readiness.

The third part of our invention relates to the combination of this detaching rig with clock-work and a dial-plate, so arranged that each stroke of the hammer on the bell or gong may be registered on such dial, so as to be readily read off at sight, and express at the same time the number of the district wherein the fire may be.

Figure 1 is a front vertical elevation of the fire-alarm register and horse-detaching rig embodying our invention. Fig. 2 is a rear vertical elevation of the principal parts of the fire-alarm register and horse-detaching rig, especially designed to exhibit the clock-work attachment. Fig. 3 is a plan of Fig. 2, with top plate removed. Fig. 4 is a front vertical elevation of the fire-alarm register and unhitching rig, wherein a gong is used within the engine-house in place of a bell at the top of the same, as in Figs. 1, 2, and 3.

With reference to Figs. 1, 2, and 3 of the drawings, B B is a box, so arranged and constructed as to hold the principal parts of this registering and detaching device. In the latter invention L is a T-shaped lever, pivoted at *n*, and, as it receives and records directly the action of the hammer, is termed the "tripping-lever." The longer arm *l* of this lever L rests on the top of a catch-bar, M, and the shorter arm K is connected to a wire, *v*, leading to the hammer of a bell at the top of the engine-house; also, in order that the arm *l* may be forced upward when the wire *v* loses its tension after each stroke of the hammer, the shorter arm K is pressed downward by a spiral spring, T, fastened to the side of the box B B. M, the perpendicular bar on which the end of the arm *l* of the lever L rests, is pivoted at *z*, and provided with a catch, G, and spiral spring S, one end of which is attached at *g*, near the end of its longer arm, and the other is adjusted so as to rest on the top of a hook-shaped piece, E. This hook-piece E pivots at *y*, its longer bent arm *b* being so arranged as to project through the box B B, so as to receive a ring, R, forming part of a powerful spring, X, which is attached in a convenient place to the engine-house building. To this ring R two thin ropes are fastened, one, *f*, being secured over a pulley to the catch-bar M, while the other, *a*, passes over the pulleys *e e′ e″* to the eyebolts *c c′ c″*, which fit into the leather halters and fixed staples, that hold the horses to their respective stalls, in such manner that on the withdrawal of these bolts these horses shall be released from their positions.

The registering apparatus, which is attached to this horse-detaching rig device, consists of the following parts: D is a dial-face, painted black, and made to revolve on its axis by a system of ordinary clock-work, *h h′ h″*, when the same is wound up in the usual manner by compression of the spring contained within the drum F. A is a chalk marker, fitted to a stout piece of wire, *w*, that pivots at O on the support *s*, behind the blackened face of the dial-plate D, and is actuated vertically up and down for rubbing the chalk stick onto this face D by means of the limb *t* of another piece of wire, bent into a V shape, connecting with it at *x*, the other limb, *u*, of this bent wire meeting the former one, *t*, over a pin, *m*, on the long arm *l* of the tripping-lever L, its office being to act as a stop to this clock-work, which it effects by meeting a fixed pin, *p*, in one of the toothed wheels *h* at certain intervals of time.

The mode of operation of the combined horse-detaching rig and register is as follows:

The clock-work, having been wound up, is stopped by the pin *p* of the wheel *h* meeting the wire *u*. Now, when the hammer strikes on the bell of the engine-house, the connecting-wire *v* being slackened, this slackness allows of the spring T forcing up the arm *l*, and thus pushes away the stop *u*, so that the dial D commences immediately to revolve, while the longer arm of the bar M falls to the right by reason of the superior force of the spring S acting on the long arm, so as to disengage the catch E; but the spring X being now unsupported, from the ring R falling off the arm *b* of the hook-catch E, as a consequence of this disengagement, pulls down the rope *a*, attached to the eyebolts *c c′ c″*, that secure the halters to the staples, and releases the horses from their stalls, so that they immediately, of their own accord, walk to their places at the head of the engine, hose-cart, or truck, placed in readiness to receive them; but at the same time each stroke of the hammer causes a corresponding upward movement of the lever *l* and wire *t*, producing a vertical reciprocating movement of the chalk marker A, attached to the wire *w* on the dial-face D, and thus writes on the dial as many marks as the hammer gives strokes; also, each pause of the hammer is recorded, for, as the dial keeps revolving all the time, and the marker only writes or marks according to the strokes of the hammer, consequently spaces must be left between these marks, as shown in Fig. 1, so that the number of the district wherein a fire may be can be readily ascertained at sight.

By this arrangement it is apparent, first, that the horse-detaching rig described may be disconnected from the registering apparatus by removing the V-shaped wire *t u* from the pin *p*, so as to act as an independent and complete device for unhitching the horses from their stalls at the first stroke of the alarm-hammer.

We, therefore, do not confine ourselves to the particular arrangement *u t s w* and revolving dial D, as other devices, as aforementioned, on a perfectly similar principle, may be substituted in place thereof.

With reference to Fig. 4, when a gong, O, is used in an engine-house in place of a bell, the short arm K, spring T, and bell-connecting wire *v* are no further required; but the wire *v′* is attached to the eye *d* at the end of the perpendicular arm *i*. The wire *v′* in this case is actuated by the hammer of the gong O striking a fixed spring, to which this wire is attached, the return movement after each stroke being effected by the pressure of a spring, *q*, fixed to the box B B acting against the side of the arm *i*, and similar results are obtained, as already described, in the case of the hammer and bell at the top of the engine-house.

In Figs. 1, 2, and 3, the tripping-lever L is represented with a vertical arm, *i*, with eye *d*, as in Fig. 4. This arm with eye is, however, not required when the connection is made to a bell and hammer arrangement, and is only represented so as to show that this same lever L may be utilized for a gong by detaching the spring T and wire *v*, and substituting the connecting-wire *v′* to this eye *d* and spring *q* against the arm *i*.

In both cases the apparatus is reset, on the return of the engine or hose-cart, &c., by re-adjusting the ring R to the bar *b* and by fitting the eyebolts to their respective halters and staples.

We claim as our invention—

1. The combination, substantially as specified, with a fire-alarm gong or bell, of a recording apparatus, consisting of a surface for receiving a record, moved by suitable mechanism, and devices for marking thereon, both controlled or released by the hammer of the bell.

2. In a horse-detaching rig for horses employed in the fire department, the detaching mechanism R X *a c c′ c″ f*, in combination with the hook-catch E *b*, bar-catch M G, provided with spring S, and tripping-lever L K fitted with spring T, and bell-hammer-connecting wire *v*, substantially as and for the purposes herein specified.

3. The detaching mechanism described, R X *a c c′ c″ f*, in combination with the hook-catch E *b*, bar-catch M G, provided with spring S and tripping-lever L *i*, with spring *q* and gong O, hammer-connecting wire *v′*, arranged and constructed as herein shown and set forth, substantially as and for the purposes specified.

4. In a fire-alarm registering device, the marker A, dial D, wires *t w u*, and pin *p*, on the wheel *h* of the clock-work *h h′ h″ h‴* F, in combination with the tripping-lever L K, provided with spiral spring T and connecting-wire *v*, catch-bar M G, with spring S, hook-catch E *b*, and detaching mechanism R X *a c c′ c″ f*, substantially as and for the purposes herein set forth and specified.

5. The marker A, dial D, wires *t w u*, and pin *p* on the wheel *h* of the clock-work *h h′ h″ h‴* F or their equivalents, in combination with the tripping-lever L *i*, provided with spring *q* and connecting-gong O, hammer-wire *v′*, catch-bar M G, with spring S, hook-catch E *b*, and detaching mechanism R X *a c c′ c″ f*, substantially as herein specified.

DANIEL T. PHELPS.
CHARLES W. EDMONDS.

Witnesses:
D. K. SWINN,
LIONEL VARICAS.